United States Patent [19]

Labrot et al.

[11] Patent Number: 4,891,490

[45] Date of Patent: Jan. 2, 1990

[54] TUBULAR ELECTRODE FOR PLASMA TORCH AND PLASMA TORCH PROVIDED WITH SUCH ELECTRODES

[75] Inventors: Maxime Labrot; Didier Pineau; Jean Feuillerat, all of Bordeaux, France

[73] Assignee: Aerospatiale Societe Nationale Industrielle, Paris, France

[21] Appl. No.: 188,483

[22] Filed: Apr. 29, 1988

[30] Foreign Application Priority Data

Apr. 29, 1987 [FR] France ............................... 87 06085

[51] Int. Cl.⁴ ............................................... B23K 9/00

[52] U.S. Cl. ................................ 219/121.52; 219/75; 219/121.48; 219/121.5

[58] Field of Search ........... 219/121.5, 121.48, 121.49, 219/121.51, 121.52, 121.36, 74, 73; 313/231.31, 231.41, 231.51

[56] References Cited

U.S. PATENT DOCUMENTS

| | | | |
|---|---|---|---|
| 3,818,174 | 6/1974 | Camacho | 219/121.5 |
| 4,426,597 | 1/1984 | Denoyer et al. | 313/331.41 |
| 4,455,470 | 6/1984 | Klein et al. | 219/121.5 |
| 4,549,065 | 10/1985 | Camacho et al. | 219/121 PM |
| 4,559,439 | 12/1985 | Camacho et al. | 219/121 PM |
| 4,587,397 | 5/1986 | Camacho et al. | 219/121 PM |
| 4,656,330 | 4/1987 | Poole | 219/121.52 |
| 4,678,888 | 7/1987 | Camacho et al. | 219/121 PW |

FOREIGN PATENT DOCUMENTS 2473248 7/1981 France .

*Primary Examiner*—M. H. Paschall

*Attorney, Agent, or Firm*—Fisher, Christen & Sabol

[57] ABSTRACT

This invention relates to a plasma torch and a first and second electrode for use in a plasma torch. Each electrode includes a tubular intermediate part which is intended to come into contact with the arc feet and a pair of end parts which are intended to facilitate connection of the electrode to the other parts of the torch. Each electrode is disposed within an enclosed fluid circulation chamber within which a cooling fluid circulates. The intermediate and end parts of each electrode are at least ten millimeters thick. The individual parts of each electrode are connected together by a moisture-impervious, disassemblable, mechanical assembly which prevents the cooling fluid from coming in contact with the interior of the electrodes.

9 Claims, 3 Drawing Sheets

TUBULAR ELECTRODE FOR PLASMA TORCH AND PLASMA TORCH PROVIDED WITH SUCH ELECTRODES

FIELD OF THE INVENTION

The present invention relates to tubular electrodes for plasma torches and to plasma torches provided with such electrodes.

BACKGROUND OF THE INVENTION

French Pat. No. 2 473 248 for example discloses plasma torches in which each of the electrodes, generally made of metal, is in one piece and is shaped to include a tubular intermediate part and two end parts whereby the electrode maybe connected to other pieces of the torch, said electrodes being disposed within sealed chambers in which a cooling fluid circulates.

In electrodes of this type, the tubular intermediate part is normally of simply shape and serves to catch the arc feed, whilst the end parts are complex in shape but do not normally come in contact with the arc feet. These electrodes are thus normally considered expendable pieces of which only the tubular intermediate part erodes.

Two methods are essentially known for making such one-piece electrodes:

the first method consists in making, then in machining, a monolithic electrode blank. This method makes it possible to obtain thin electrodes wherein the electrode wall has a thickness of some millimeters or less. Consequently, these electrodes wear rapidly and must be replaced frequently, thereby giving rise to high costs of use and limitations of the performances of the torches;

the second method of making one-piece electrodes consists of producing and machining blanks of electrode parts, then in welding said pieces together by electron bombardment. This second method makes it possible to obtain thicker electrodes than those obtained by the first method. However, owing to the mode of welding, it is hardly possible to obtain an electrode thickness greater than ten millimeters, with the result that the electrodes thus produced must also be frequently replaced. In addition to the fact that welding by electron bombardment does not allow connection of thick pieces, it risks causing surface irregularities and differences in the welding zone, leading to rapid breakdown of said electrodes. Furthermore, if, an electrode obtained by electron bombardment welding is sought to be serviced by replacing the eroded part of the electrode and welding a new electrode component to the remaining portions of the electrode, the electrode thus obtained will likely exhibit inferior alignment of its components in comparison to a new electrode. This results in deterioration in the performances of the torch.

In addition, whatever the known method of making the electrodes, taking into account the fact that an electrode of appropriate metal must be associated with the plasmagenic gas used, the electrodes must be entirely replaced if it is desired to employ the torch with different plasmagenic gases.

SUMMARY OF THE INVENTION

It is an object of the present invention to overcome the drawbacks of these known electrodes for plasma torches.

To that end, according to the invention, the electrode for plasma torch comprising a tubular intermediate part intended for catching the arc feet and extended by end parts intended for connection to other parts of said torch, said electrode being disposed in a tight chamber in which a cooling fluid circulates, is noteworthy in that said intermediate and end parts are constituted by individual pieces whose thickness is at least equal to ten millimeters and in that said individual pieces are connected together by a dismountable, tight, mechanical assembly.

Thanks to the invention, thick electrodes are thus obtained whose life duration is long and which do not need to be replaced frequently. Moreover, thanks to the considerable thickness of the electrodes of the invention, a mechanical assembly of the individual pieces may be effected, with the result that it becomes easy to interchange just the eroded intermediate tubular part of an electrode. Moreover, the mechanical assembly of individual electrode components utilized by the present invention also makes it possible to quickly and easily select and insert into the torch the optimal type of intermediate electrode portion for use with any particular plasmagenic gas.

It is surprizing to have been able to obtain satisfactory electrodes by mechanical assembly of parts which, up to the present time, it was thought had to be assembled together by electron bombardment welding a process, which limited the thickness of the electrodes obtained. In fact, the electrodes produced by the present invention not only present an excellent electrical conduction at the connections of their constituent parts, but they are also perfectly tight at the level of these connections, whereby the cooling fluid circulating outside the walls of the electrodes cannot pass inside said electrodes.

In an advantageous embodiment, said mechanical assembly comprises:

for each piece to be assembled, a peripheral shoulder which is disposed near said enclosed cooling fluid circulation chamber and which is disposed at right angles to the axis of said tubular intermediate part, and a thread coaxial to said tubular intermediate part; and a seal disposed between said cooperating peripheral shoulders of two assembled parts, whereby said adjacent parts of said electrode may be joined together in a fluid-impervious fashion.

Applicants have observed that such an assembly presented a contact resistance of the order of 0.1 to 1 milliohm, which is perfectly admissible for the overall conduction of the electrode. Moreover, due to the considerable thickness of the parts of the electrode and to the proximity of the peripheral shoulders to the enclosed fluid circulation chamber, the seals, on the one hand, are not subjected directly to the high temperature of the arc, and, on the other hand, are subjected to efficient cooling. They may be made in any known manner from elastomers capable of withstanding temperatures of the order of 100° C. to 200° C.

In a variant embodiment, said mechanical assembly comprises:

for each part to be assembled, a peripheral shoulder which is disposed near said enclosed fluid circulation chamber and which is disposed at right angles to the axis of said tubular intermediate part, a cylindrical surface coaxial to said tubular intermediate part and disposed posterior to said shoulder (i.e., further away from said enclosed fluid circulation chamber), and a thread likewise disposed coaxial to said tubular intermediate part and extending along said cylindrical surface; and a seal disposed between said cooperating cylindrical surfaces of the two assembled parts.

Said mechanical assembly preferably further comprises centering means formed by cooperating cylindrical surfaces of said electrode parts being assembled, said cylindrical surfaces being coaxial to said tubular intermediate portion of said electrode and extending away from said thread, opposite the peripheral shoulder disposed near said enclosed fluid circulation chamber. In this way, assembly of the parts of the electrode is rendered easier.

Said thread of each part to be assembled is advantageously made at least substantially half way through the thickness of said piece.

The present invention also relates to a plasma torch comprising at least one electrode constituted by a tubular intermediate part intended for catching arc feet and extended end parts intended for connection to other parts of said torch said end parts disposed at each end of said tubular intermediate part, said electrode being disposed in an enclosed fluid circulation chamber in which a cooling fluid circulates but is kept separate from the inside of said electrodes. Said torch is noteworthy in that the intermediate and end parts of said electrode are constituted by individual parts whose thickness is at least equal to ten millimeters and in that said individual parts are connected together by a tight, dismountable, mechanical assembly. This mechanical assembly may of course present the additional particular features mentioned hereinabove.

In a particular case of said torch comprising a first electrode and a second electrode, which are coaxial, disposed one after the other, and wherein the end part of the second electrode opposite the first electrode forms a flare outwardly away from the tubular intermediate part of said second electrode, it is advantageous if said cooperating cylindrical centering surfaces borne by the end part and the intermediate part of said second electrode, extend up to, and are included with the beginning portion of said flare, with the result that the end part of the tubular intermediate part of said second electrode forms a portion of the exposed surface of said flare. In this way, this central curved part of the second electrode which is, subjected to considerable erosion, is easily replaceable in the course of replacing the tubular intermediate portion of the second electrode which is subject to erosion, whilst the flared end part of said electrode, which has a complex shape, virtually does not suffer erosion and therefore need not be replaced as frequently.

BRIEF DESCRIPTION OF THE DRAWINGS

The invention will be more readily understood on reading the following description with reference to the accompanying drawings, in which.

DETAILED DESCRIPTION OF THE PREFERRED EMBODIMENT

Figure 1:
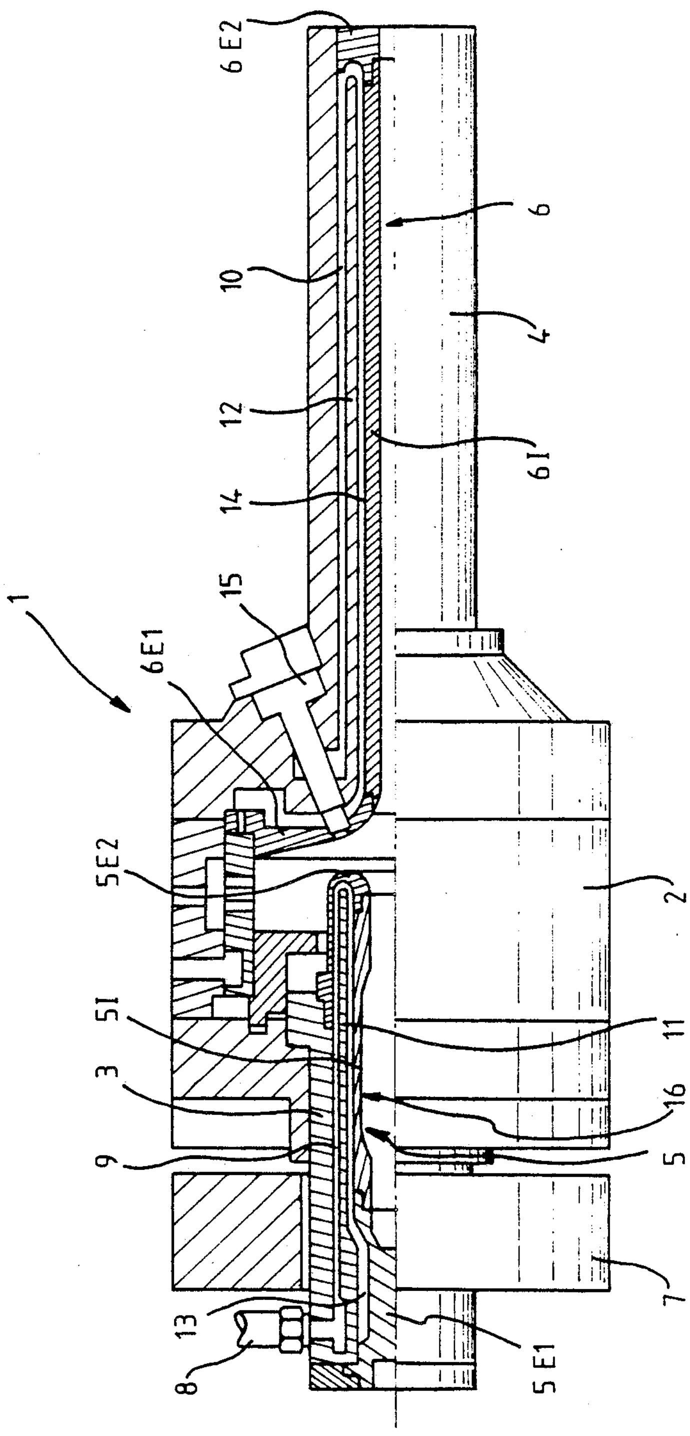
FIG. 1 is a schematic section, half in longitudinal section, half in outside view, of a plasma torch according to the present invention.

Referring now to the drawings, the plasma torch 1 according to the present invention and shown in FIG. 1, comprises a body 2 incorporating two envelopes 3 and 4. Inside envelope 3 is mounted a cathode 5, whilst, inside envelope 4, there is mounted an anode 6. A coil 7 is provided around envelope 3.

Cathode 5 and anode 6 are of extended tubular form and they are mounted coaxially, one after the other. Inside the body 2 and envelopes 3 and 4, there is provided a network of circulation of cooling fluid, connected outside the torch to means for circulating such a fluid (not shown) via connections 8, of which only one has been shown in FIG. 1. This cooling fluid network comprises enclosed cylindrical fluid circulation chambers 9 and 10, in which are respectively disposed cathode 5 and anode 6. Cylindrical walls 11 and 12, disposed in said enclosed fluid circulation chambers 9 and 10 and coaxially surrounding said cathode and anode 5 and 6 respectively, make it possible to form around the latter laminar cylindrical spaces 13 and 14 respectively, through which said cooling fluid may flow, but from which said cooling fluid may not escape, whereby said fluid cannot come in contact with the interior of said electrodes.

An arcing device 15 is provided in the vicinity of the two opposite ends of the cathode 5 and anode 6.

The torch 1 will not be described in greater detail, as it is of known type and simply a description of the particular features of its electrodes is sufficient to understand the present invention.

As shown in FIG. 1, the cathode 5 is constituted by a tubular intermediate part 5 I, which is connected to end parts 5 E1 and 5 E2. The intermediate part 5 I is of simple cylindrical form and it is intended for catching the arc feet; it is therefore subject to erosion, as illustrates schematically at 16 in FIG. 1. On the other hand, the end parts 5 E1 and 5 E2 are intended for connection to other parts of the torch 1 (not described in detail) and are complex in shape, and hence more difficult and expensive to manufacture than the intermediate part 5I of the cathode 5. The relative complexity of the cathode end parts 5E1 and 5E2 is increased by the fact that they form at least in part the circuit for circulation of cooling fluid.

Figure 2:
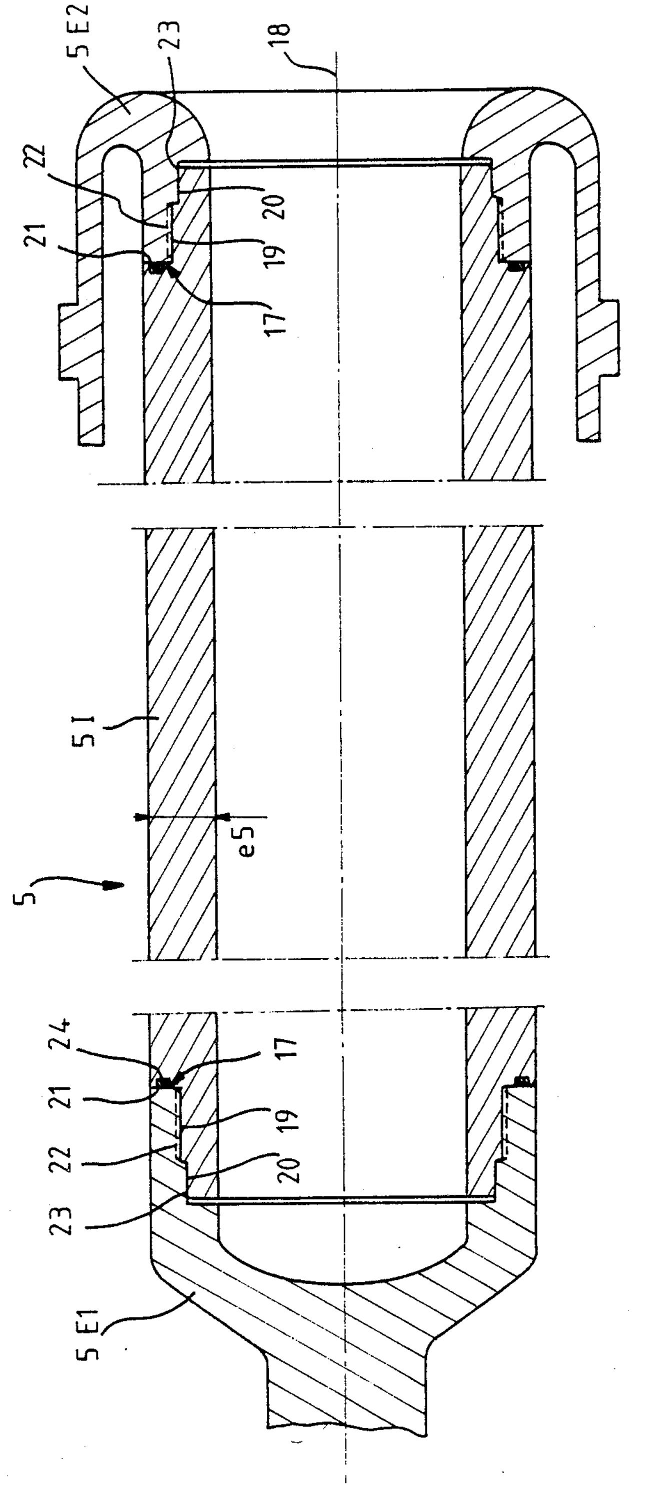
FIG. 2 is an enlarged, partial view in longitudinal section of the cathode of the plasma torch of FIG. 1.
Figure 3:
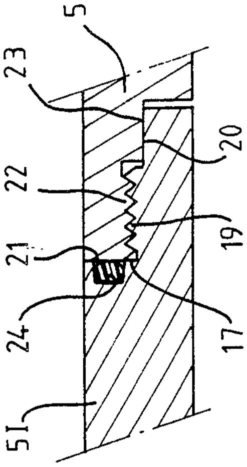
FIG. 3 is an enlarged view in section, illustrating the assembly of the different parts of the cathode of FIG. 2, as well as certain parts of the anode of said plasma torch.

According to the invention as best seen in FIG. 2, (cf. also FIG. 3), the three parts 5 I, 5 E1 and 5 E2 of cathode 5 have a wall thickness e5 at least equal to ten millimeters, and preferably of the order of twenty five millimeters, and their ends are machined to allow tight mechanical assembly by screwing together of the constituent parts.

To that end, there is machined at the two ends of the tubular intermediate part 5 I of the cathode, a peripheral shoulder 17 of which is disposed at right angles to the axis 18 of the cathode 5, a thread 19 disposed substantially half way through the thickness of the cathode and coaxial to the axis 18 and a male cylindrical surface 20 for facilitating the centering of the constituent parts of the cathode, 5E1, 5E2 and 5I which are, likewise coaxial to axis 18. Furthermore, in each of the ends of the end parts 5 E1 and 5 E2 intended to come in contact with the ends of the intermediate part 5 I, there is machined a peripheral shoulder 21 which is disposed at right angles to axis 18, a thread 22 coaxial to axis 18 and a female cylindrical surface 23 facilitating the centering of the constituent parts of the cathode, 5E1, 5E2 and 5I which are likewise coaxial to axis 18.

Tight moisture impervious mechanical assembly of the tubular intermediate part 5 I and of the end parts 5 E1 and 5 E2 of the cathode 5 is thus obtained by the cooperation of the threads 19 and 22 and of shoulders 17 and 21, at least one seal 24 being disposed between the cooperating shoulders of said parts. The housings of seals 24 are preferably machined in the shoulders 17 of the tubular intermediate part 5 I.

Figures 4, 5, 6:
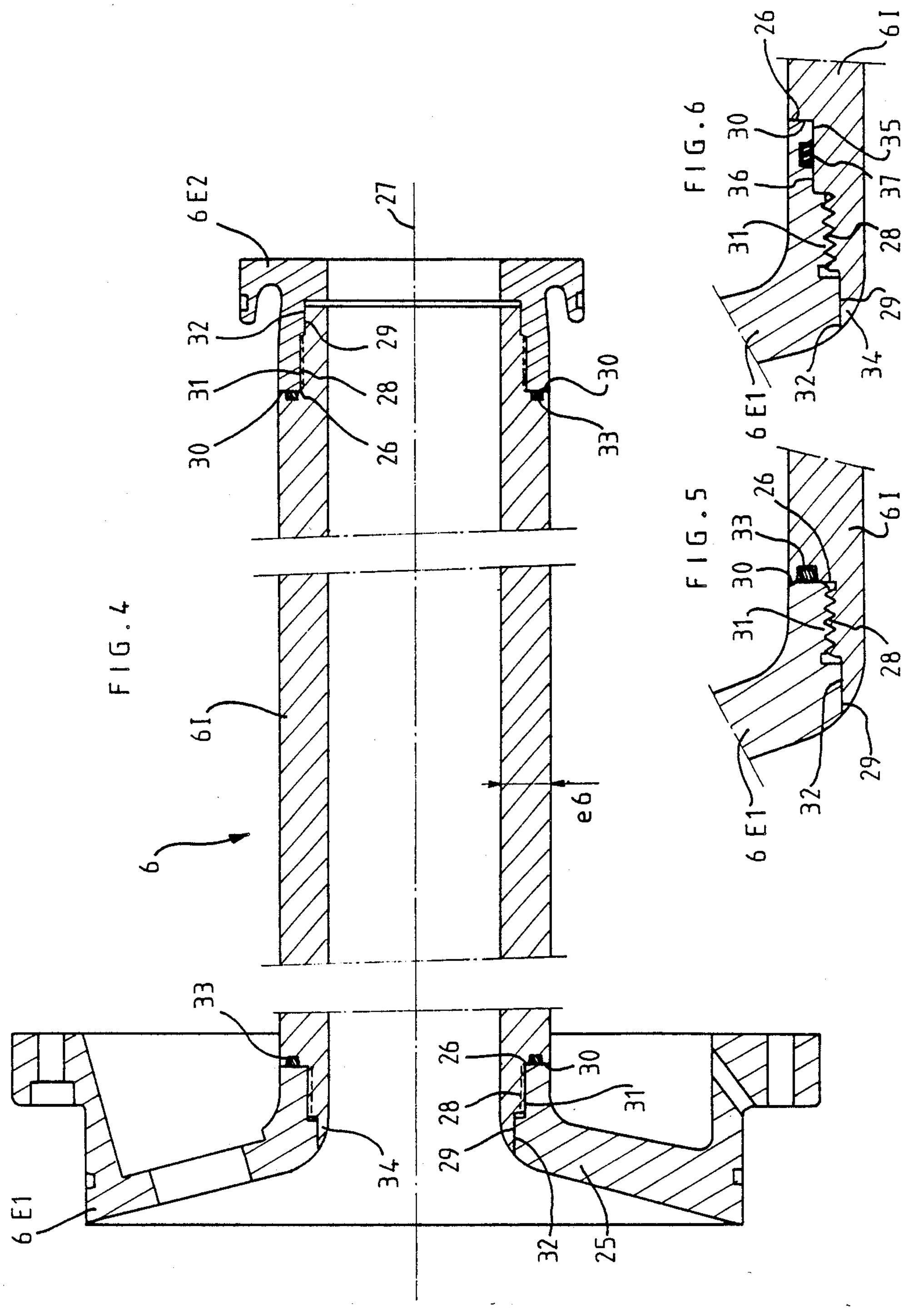
FIG. 4 is an enlarged view in longitudinal section of the anode of the plasma torch of FIG. 1.
FIGS. 5 and 6 illustrate two variant embodiments of the assembly of certain parts of the anode of FIG. 4.

Furthermore, as shown on a larger scale in FIG. 4, the anode 6 is constituted by a tubular intermediate part 6 I, which is connected to end parts 6 E1 and 6 E2. The intermediate part 6 I is of simple cylindrical shape and subject to erosion, as indicated for part 5 I of cathode 5. Like parts 5 E1 and 5 E2, the end parts 6 E1 and 6 E2 are complex in shape. In particular, the end part 6 E1, disposed opposite cathode 5, forms a flare 25.

The three parts 6 I, 6 E1 and 6 E2 of anode 6 likewise have a wall thickness e6 at least equal to ten millimeters, and preferably of the order of twenty five millimeters, and their ends are machined to allow for tight mechanical assembly by screwing.

As also shown in FIG. 5, at the two ends of the tubular part 6 I, there is machined a peripheral shoulder 26 which is disposed at right angles to axis 27 of the anode 6, a thread 28 disposed substantially half way through the thickness of the anode 6 and coaxial to axis 27 of said anode 6 and a male cylindrical centering surface 29, likewise coaxial to the axis 27. Furthermore, in each of the ends of the end parts 6 E1 and 6 E2 intended to come in contact with the ends of the intermediate part 6 I, there is machined a peripheral shoulder 30 which is disposed at right angles to axis 27, a thread 31 coaxial to axis 27 and a female cylindrical centering part 32, likewise coaxial ~~to~~ axis 27. It will be noted that the female cylindrical centering part 32 of part 6 E1 opens out into flare 25.

Tight moisture impervious mechanical assembly of the tubular intermediate part 6 I and of end parts 6 E1 and 6 E2 of the anode 6 is thus obtained by the cooperation of the threads 28 and 31 and of shoulders 26 and 30, at least one seal 33 being disposed between the cooperating parts of said shoulders. The housings of seals 33 are preferably inserted in the shoulders 26 of the tubular part 6 I.

It will be noted that, near part 6 E1, the end 34 of the tubular intermediate part 6 I, having its posterior surface in contact with the female centering part 32 of end part 6 E1, forms the central, erodable part of the flare 25.

The variant embodiment of FIG. 6 also incorporates the shoulders 26 and 30, the threads 28 and 31 and the centering surfaces 29 and 32. However, in this case, between said threads and said shoulders, there are provided cylindrical surfaces 35 (on part 6 I) and 36 (on parts 6 E1 and 6 E2) coaxial to axis 27 and a seal 37 is disposed between these surfaces 35 and 36.

What is claimed is:

1. A plasma torch comprising: at least one electrode constituted by a tubular intermediate part intended for catching arc feet; end parts intended for use in connecting said electrode to other parts of said torch; and an enclosed fluid circulation chamber within which a cooling fluid circulates, wherein the intermediate and end parts of said electrode have a thickness of at least equal to ten millimeters, and said individual parts of said electrode are connected together by mechanical assembly means, whereby said intermediate and end parts of said electrode may be assembled together to form a tight, disassemblable, moisture-impervious electrode and comprising for each part of said electrode to be assembled:

(i) a peripheral shoulder which is disposed near said enclosed fluid circulation chamber, said peripheral shoulder disposed at right angles to the axis of said tubular intermediate part of said electrode;

(ii) a thread coaxial to said tubular intermediate part of said electrode;

(iii) a centering cylindrical surface coaxial to said tubular intermediate part of said electrode and extending in a direction coplanar to said thread and perpendicular to said peripheral shoulder; and a seal disposed between the cooperating mechanical assembly means of two assembled parts of said electrode.

2. The plasma torch as disclosed in claim 2, comprising a first electrode and a second electrode, which are coaxial and disposed one after the other, wherein the end part of the second electrode disposed opposite to the end part of the first electrode forms a flare in relation to the intermediate part of said second electrode, wherein said second electrode further comprises centering means, said centering means formed by cooperating cylindrical surfaces, one of said cooperating cylindrical surfaces disposed on each of said electrode parts to be assembled, said cylindrical surfaces being coaxial to said intermediate tubular part of said electrode and extending in a direction co-planar to said thread and perpendicular to said peripheral shoulder, wherein said cooperating cylindrical surfaces, borne by the end part of said second electrode disposed proximal to said first electrode and the intermediate part of said second electrode, extend up to and comprise a portion of said flare, with the result that the end of the tubular intermediate part of said second electrode forms the central part of said flare, and forms a major portion of the area of said flare which is exposed within the interior of said second electrode.

3. The plasma torch of claim 1, wherein, for each part of said electrode to be assembled, said thread disposed on each part to be assembled is disposed at least substantially half way through the thickness of said part.

4. The plasma torch of claim 1, wherein said seal is disposed between the cooperating peripheral shoulders of two assembled parts of said electrode.

5. The plasma torch of claim 1, wherein, for each part of said electrode to be assembled, said mechanical assembly means further comprises an additional cylindrical surface coaxial to said tubular intermediate part of said electrode and disposed further away from said enclosed fluid circulation chamber than said peripheral shoulder, said thread extending along said additional cylindrical surface and said seal being disposed between the cooperating additional cylindrical surfaces of two assembled parts of said electrode.

6. An electrode for use in a plasma torch comprising:

(a) a tubular intermediate part intended for catching the arc feet;

(b) end parts intended for use in connecting said electrode to other parts of said torch, said end parts connected to said intermediate part of said electrode at each end of said intermediate part of said electrode;

(c) an enclosed fluid circulation chamber within which a cooling fluid circulates, said electrode disposed within said enclosed fluid circulation chamber;

(d) said intermediate and said end parts of said electrodes are constituted by individual parts whose thickness is at least equal to ten millimeters;

(e) mechanical assembly means for connecting said intermediate and said end parts of said electrodes together, said mechanical assembly means being disassemblable and moisture-impervious and comprising for each part of said electrode to be assembled:

(i) a peripheral shoulder which is disposed near said enclosed fluid circulation chamber, said peripheral shoulder disposed at right angles to the axis of said tubular intermediate part of said electrode;

(ii) a thread coaxial to said tubular intermediate part of said electrode;

(iii) a centering cylindrical surface coaxial to said tubular intermediate part of said electrode and extending in a direction coplanar to said thread and perpendicular to said peripheral shoulder; and (f) a seal disposed between the cooperating mechanical assembly means of two assembled parts of said electrode.

7. The electrode of claim 6, wherein for each part of said electrode to be assembled said thread of each part to be assembled is disposed at least substantially half way through the thickness of said part.

8. The electrode of claim 6, wherein said seal is disposed between the cooperating peripheral shoulders of two assembled parts of said electrode.

9. The electrode of claim 6, wherein, for each part of said electrode to be assembled, said mechanical assembly means further comprises an additional cylindrical surface coaxial to said tubular intermediate part of said electrode and disposed further away from said enclosed fluid circulation chamber than said peripheral shoulder, said thread extending along said additional cylindrical surface and said seal being disposed between the cooperating additional cylindrical surfaces of two assembled parts of said electrode.

* * * * *